(12) United States Patent
Hakala et al.

(10) Patent No.: US 10,990,428 B2
(45) Date of Patent: Apr. 27, 2021

(54) VIRTUAL MACHINE INTEGRITY

(71) Applicant: Telefonaktiebolaget LM Ericsson (publ), Stockholm (SE)

(72) Inventors: Harri Hakala, Turku (FI); Ari Pietikäinen, Jorvas (FI); Ben Smeets, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 188 days.

(21) Appl. No.: 15/741,467

(22) PCT Filed: Jul. 3, 2015

(86) PCT No.: PCT/EP2015/065208
§ 371 (c)(1),
(2) Date: Jan. 2, 2018

(87) PCT Pub. No.: WO2017/005276
PCT Pub. Date: Jan. 12, 2017

(65) Prior Publication Data
US 2018/0365045 A1    Dec. 20, 2018

(51) Int. Cl.
*G06F 9/455* (2018.01)
*H04L 9/32* (2006.01)
(Continued)

(52) U.S. Cl.
CPC .......... *G06F 9/45558* (2013.01); *G06F 21/57* (2013.01); *G06F 21/575* (2013.01);
(Continued)

(58) Field of Classification Search
CPC ... G06F 2009/45562; G06F 2009/4557; G06F 21/57; G06F 21/64; G06F 9/45558; H04L 9/3239
See application file for complete search history.

(56) References Cited

U.S. PATENT DOCUMENTS 6,691,232 B1 *  2/2004  Wood ................. H04L 63/0815
                                                          726/6
9,780,950 B1 * 10/2017  Dundas .................... H04L 9/006
(Continued)

OTHER PUBLICATIONS

International Search Report and Written Opinion issued in International Application No. PCT/EP2015/065208, dated Mar. 23, 2016, 17 pages.
(Continued)

*Primary Examiner* — Jorge A Chu Joy-Davila
(74) *Attorney, Agent, or Firm* — Rothwell, Figg, Ernst & Manbeck, P.C.

(57) ABSTRACT

A method of verifying the integrity of a virtual machine in a cloud computing deployment comprises: creating a virtual machine image derived from a trusted virtual machine, wherein the trusted virtual machine has a Keyless Signature Infrastructure signature stored in a signature store; and verifying that a computation resource can be trusted. If it is verified that a computation resource can be trusted, the method further comprises: submitting the virtual machine image to the trusted computation resource; checking a signature of the virtual machine image against the stored signature of the trusted virtual machine; launching the virtual machine image on the trusted computation resource, and creating a Keyless Signature Infrastructure signature of the virtual machine image; and storing the signature of the virtual machine image in a signature store.

11 Claims, 5 Drawing Sheets

(51) Int. Cl.
G06F 21/57 (2013.01)
G06F 21/64 (2013.01)
(52) U.S. Cl.
CPC ............ *G06F 21/64* (2013.01); *H04L 9/3239* (2013.01); *H04L 9/3247* (2013.01); *H04L 9/3297* (2013.01); *G06F 2009/4557* (2013.01); *G06F 2009/45562* (2013.01); *H04L 2209/38* (2013.01)

(56) References Cited

U.S. PATENT DOCUMENTS

| | | | | |
|---|---|---|---|---|
| 2007/0042754 | A1* | 2/2007 | Bajikar | H04W 12/04031 455/411 |
| 2012/0191929 | A1* | 7/2012 | Zietzke | G06F 9/45533 711/162 |
| 2012/0233378 | A1* | 9/2012 | Elteto | G06F 9/45558 711/6 |
| 2012/0324446 | A1* | 12/2012 | Fries | G06F 21/64 718/1 |
| 2014/0040886 | A1* | 2/2014 | Coles | G06F 9/4401 718/1 |
| 2014/0096134 | A1* | 4/2014 | Barak | G06F 21/566 718/1 |
| 2015/0052615 | A1* | 2/2015 | Gault | G06F 21/60 726/26 |

OTHER PUBLICATIONS

Jeremy Tate et al., "Secure and Tamper Proof Code Management", Cyber Security Analytics, Intelligence and Automation, New York, NY, Nov. 3, 2014, pp. 19-24.

Ahto Buldas et al., "Keyless Signatures Infrastructure: How to Build Global Distributed Hash-Trees", International Association for Cryptologic Research, Dec. 16, 2013, pp. 1-9.

Russell G. Shirey et al., "Analysis of Implementation to Secure Git for Use as an Encrypted Distributed Version Control System", 2015 48th Hawaii International Conference on System Sciences, IEEE, Jan. 5, 2015, pp. 5310-5319.

Mikael Eriksson et al., "Trusted Computing for Infrastructure", Retrieved from the Internet. ericsson.com/res/thecompany/docs/publications/ericsson_review/2014/er-trusted-computing.pdf, Oct. 24, 2014, 9 pages.

Ahto Buldas et al., "Efficient Quantum-Immune Keyless Signatures with Identity", International Association for Cryptologic Research, Sep. 2, 2014, pp. 1-14.

Teemu Kanstren et al., "Architecture for High Confidence Cloud Security Monitoring", 2015 IEEE International Conference on Cloud Engineering, IEEE, Mar. 9, 2015, pp. 195-200.

Fangzhou Yao et al., "CryptVMI: Encrypted Virtual Machine Introspection in the Cloud", 2014 IEEE 7th International Conference on Cloud Computing, IEEE, Jun. 27, 2014, pp. 977-978.

Ahto Buldas et al., "Adoting KSI for Efficient Record-Level Signing of Event Logs—DRAFT", Retrieved from the Internet: scholar.googleusercontent.com/scholar?q=cache:MkJIZYiyBRgJ:scholar.google.com, Jan. 1, 2013, 27 pages.

Raghu Yeluri et al., Building the Infrastructure for Cloud Security A Solutions View, Apress Open, Copyright 2014, 240 pages.

European Communication, issued in corresponding European Patent Application No. 15 738 868.7 dated Apr. 8, 2020, (7 pages).

Erin Banks et al., "Trusted Geolocation in the Cloud: Proof of Concept Implementation (Draft)", NIST Interagency Report 7904, Dec. 31, 2012, (42 pages).

Yeluri Raghu et al., Chapter 4, "Attestation: Providing Trustability" XP055763916, Mar. 2014 (pp. 65-91).

* cited by examiner

VIRTUAL MACHINE INTEGRITY

CROSS REFERENCE TO RELATED APPLICATION(S)

This application is a 35 U.S.C. § 371 National Stage of International Patent Application No. PCT/EP2015/065208, filed Jul. 3, 2015, designating the United States, the disclosure of which is incorporated by reference.

TECHNICAL FIELD

This relates to ensuring the integrity of virtual machines in a cloud computing deployment.

BACKGROUND

It is desirable to deploy virtual machines in a cloud computing deployment. In such a system, the virtual machine acts as a software emulation of a specific computer system running specific software. The virtual machine can then execute on computation resources that are provided in the cloud.

It is preferable that virtual machine images that are launched by a tenant are based on a trusted source, and that the integrity of the images can be attested over their whole lifecycle. In addition the tenant will typically prefer that the virtual machine should execute only on compute resources that are trustworthy, for example on resources that have been booted or created with approved software components.

Here we use the word "launch" to mean the start of code execution of, say, a virtual machine image by a compute resource that is in operation. The word "boot" means to start code execution of, say the code of the compute resource, by a compute resource, usually hardware, that is in a pristine state.

Solutions that are based on a Public Key infrastructure, such as described in US2011/0302415 or US2015/0134965, require trust establishment with a trusted third party. In any event, such solutions are problematic in large scale implementations, because of the complexity of issues related to certificate lifetime and certificate management, such as certificate renewal, certificate revocation and certificate long-term storage.

SUMMARY

According to an aspect of the invention, there is provided a method of verifying the integrity of a virtual machine in a cloud computing deployment. The method comprises: creating a virtual machine image derived from a trusted virtual machine, wherein the trusted virtual machine has a Keyless Signature Infrastructure signature stored in a signature store; and verifying that a computation resource can be trusted. If it is verified that a computation resource can be trusted, the method further comprises: submitting the virtual machine image to the trusted computation resource; checking a signature of the virtual machine image against the stored signature of the trusted virtual machine; launching the virtual machine image on the trusted computation resource, and creating a Keyless Signature Infrastructure signature of the virtual machine image; and storing the signature of the virtual machine image in a signature store. Besides the advantage of avoiding ordinary public-key technology and certificates, the signatures used here are quantum computing immune, that is, they remain valid even if quantum computing becomes possible. The latter is not true for existing public-key based signatures and certificates which opens up for back dating attacks.

The virtual machine image may comprise a migration or a clone of the trusted virtual machine. The trusted virtual machine may be a virtual machine golden image or a virtual machine image that has an associated signature that is created by an entity that we control (and thus trust) or by an entity whose function we trust through proper audit of its implementation and operation.

Verifying that the computation resource can be trusted may comprise receiving attested information about a boot of the computation resource.

According to another aspect, there is provided a system for verifying the integrity of a virtual machine in a cloud computing deployment. The system comprises: a virtual machine preparation entity, for creating a virtual machine image, derived from a trusted virtual machine having a Keyless Signature Infrastructure signature; a signature store, for storing the signature of the trusted virtual machine; a cloud computation system, comprising computation resources; a verification entity, for verifying that a computation resource can be trusted; and a virtual machine image launch entity, for launching the virtual machine image on the computation resource if it is verified that the computation resource can be trusted, and for creating a Keyless Signature Infrastructure signature of the virtual machine image and storing the signature of the virtual machine image in the signature store.

According to another aspect, there is provided a method for use in a virtual machine preparation entity. The method comprises: receiving a request for creation of a virtual machine image derived from a trusted virtual machine, creating the virtual machine image; creating a Keyless Signature Infrastructure signature of the virtual machine image; and storing the Keyless Signature Infrastructure signature of the virtual machine image in a signature store.

The virtual machine image may comprise a migration or a clone of the trusted virtual machine.

The trusted virtual machine may be a virtual machine golden image.

According to another aspect, there is provided a virtual machine preparation entity, being configured for performing a method according to the previous aspect.

According to another aspect, there is provided a method for use in a virtual machine image launch entity. The method comprises: receiving a request to launch a virtual machine image on a computation resource; determining if the computation resource can be trusted; and if it is determined that the computation resource can be trusted, launching the virtual machine image on the computation resource; creating a Keyless Signature Infrastructure signature of the virtual machine image; and storing the signature of the virtual machine image in the signature store.

Determining if the computation resource can be trusted may comprise receiving a notification from a verification entity.

According to another aspect, there is provided a virtual machine image launch entity, being configured for performing a method according to the previous aspect.

According to another aspect, there is provided a method for use in a verification entity. The method comprises: receiving a request to confirm whether a computation resource can be trusted; receiving attested information regarding software that has been booted on the computation resource; and confirming whether the computation resource can be trusted.

According to another aspect, there is provided a verification entity, being configured for performing a method according to the previous aspect.

According to other aspects, there are provided a computer program configured, when run on a computer, to carry out a method according to any previous aspect, and a computer program product comprising computer readable medium and such a computer program stored on the computer readable medium.

This has the advantage that certain embodiments enable efficient preservation of the integrity of virtual machines in a large scale cloud deployment, and execution of virtual machines on trustworthy computation resources, without requiring key and certificate management after the initial clean state establishment.

DETAILED DESCRIPTION

Figure 1:
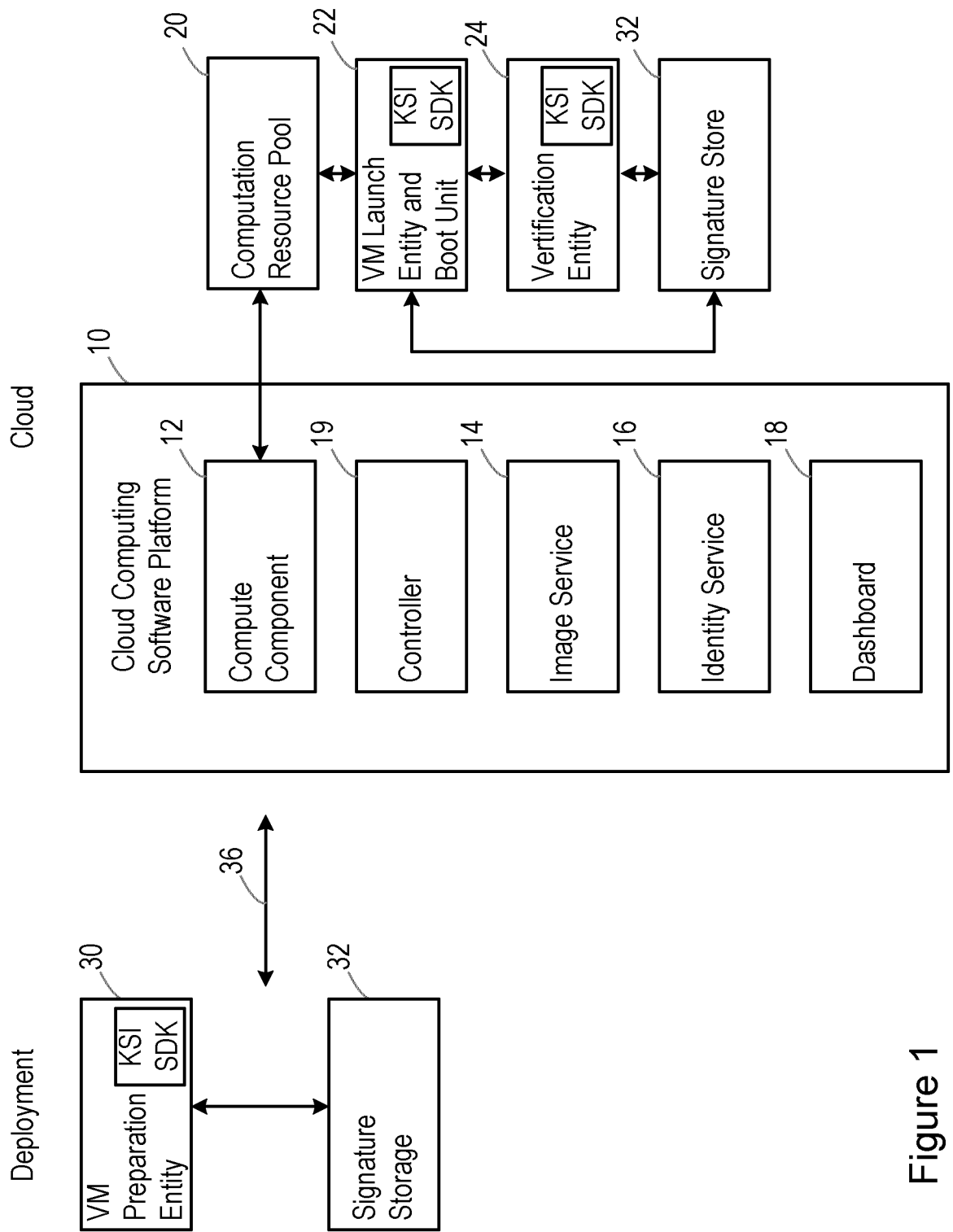
FIG. 1 illustrates a cloud computing system.

FIG. 1 illustrates a computing system, showing entities provided in a cloud, and entities provided in a tenant or customer of the cloud service provider. It will be appreciated that the entities shown in FIG. 1 may be provided as hardware, or may be software, running in a virtualized environment such that there is no specific hardware dedicated to any specific entity.

The cloud includes a cloud computing software platform 10, which includes various components such as a compute component 12, an image service component 14, an identity service 16, a dashboard 18, and a controller 19. In some embodiments, the cloud computing software platform 10 is the OpenStack cloud computing software platform, in which case the compute component 12 is the OpenStack Nova component, the image service component 14 is the OpenStack Glance component, the identity service 16 is the OpenStack Keystone component, and the dashboard 18 is the OpenStack Horizon component. However, the references to OpenStack components are provided only as an example of a possible implementation, and other virtualization platforms can be used.

The cloud also includes a computation resource pool 20, which in this embodiment is in communication with a virtual machine launch entity and boot unit 22, which in turn is in communication with a verification entity 24.

The tenant, that is the customer of the cloud service provider, is provided with a virtual machine preparation entity 30.

At least one storage unit acts as a trusted virtual machine signature store 32. In some embodiments, there is a trusted virtual machine signature store residing in the cloud service provider's infrastructure in the cloud, and containing partitions for both the tenant and the provider. In some embodiments, the "store" can be just files optionally protected by a password, with no specific hardware dedicated to the signature store.

FIG. 1 shows the virtual machine preparation entity 30 having a direct connection to the trusted virtual machine signature store 32, though in these embodiments the virtual machine preparation entity 30 may be connecting to the respective partition of the trusted virtual machine signature store 32 in the cloud.

Entities in the cloud, such as the virtual machine launch entity and boot unit 22, and the verification entity 24, also have connections to the provider's partition of the trusted virtual machine signature store 32 in the cloud.

The tenant is able to connect to the cloud over a communications network 36, for example the internet.

Figure 2:
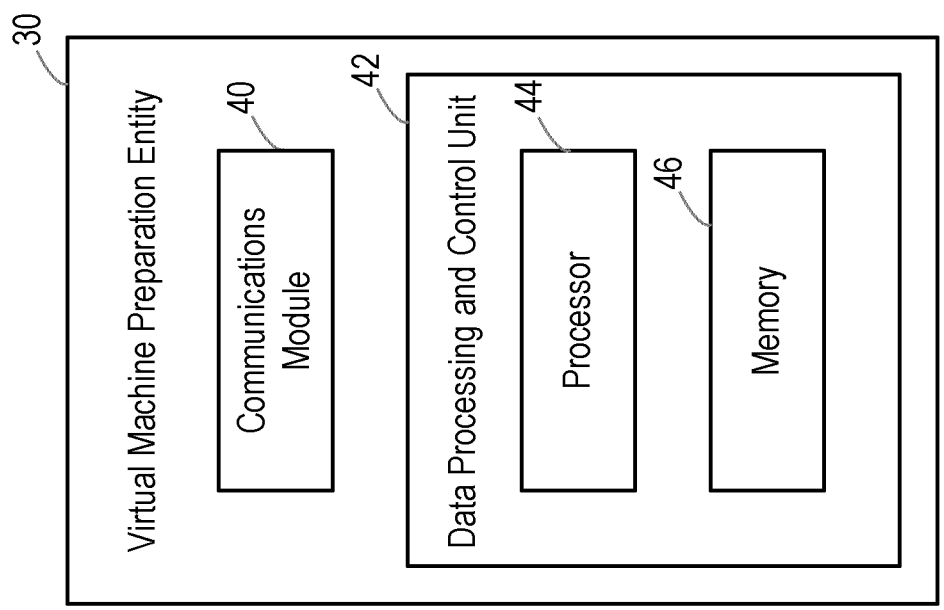
FIG. 2 illustrates a virtual machine preparation entity in the cloud computing system of FIG. 1.

FIG. 2 shows the form of the virtual machine preparation entity 30 in the cloud computing system of FIG. 1.

The virtual machine preparation entity 30 includes a communications module 40 and a data processing and control unit 42. The data processing and control unit 42 includes a processor 44 and a memory 46. The processor 44 performs data processing and logical operations, and the memory 46 stores working data and program instructions for causing the processor to perform the methods described herein. The communications module 40 communicates at least with the storage unit 32 and over the network 36.

Figure 3:
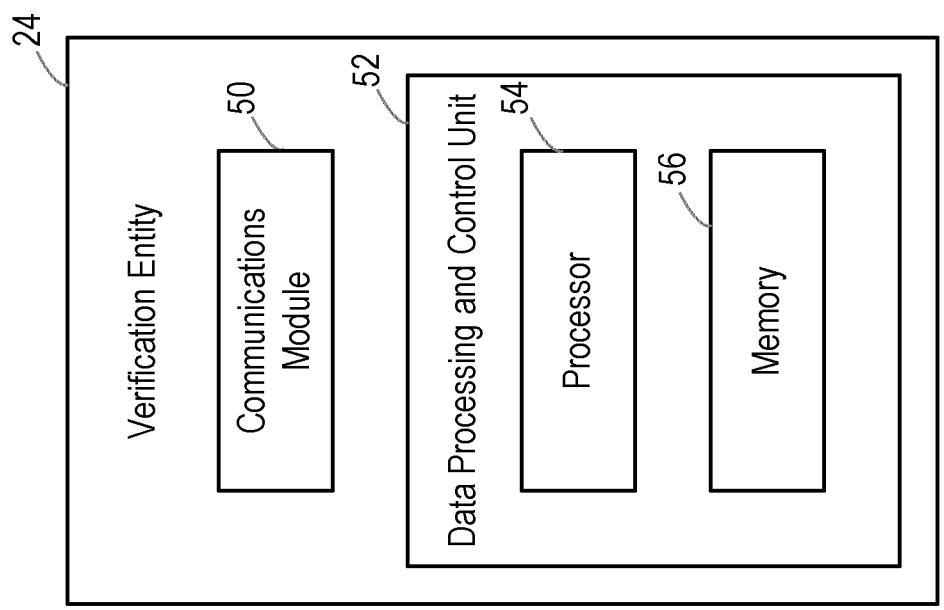
FIG. 3 illustrates a verification entity in the cloud computing system of FIG. 1.

FIG. 3 shows the form of the verification entity 24 in the cloud computing system of FIG. 1.

The verification entity 24 includes a communications module 50 and a data processing and control unit 52. The data processing and control unit 52 includes a processor 54 and a memory 56. The processor 54 performs data processing and logical operations, and the memory 56 stores working data and program instructions for causing the processor to perform the methods described herein. The communications module 50 communicates at least with the virtual machine launch entity and boot unit 22.

Figure 4:
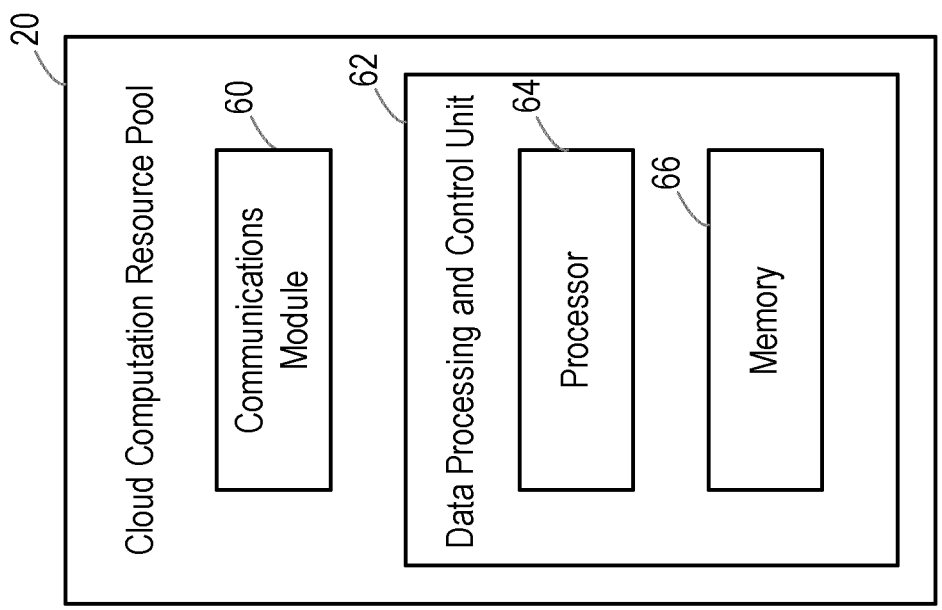
FIG. 4 illustrates a cloud computation resource pool in the cloud computing system of FIG. 1.

FIG. 4 shows the form of the cloud computation resource pool 20 in the cloud computing system of FIG. 1.

The cloud computation resource pool 20 includes a communications module 60 and a data processing and control unit 62. The data processing and control unit 62 includes a processor 64 and a memory 66. The processor 64 performs data processing and logical operations, and the memory 66 stores working data and program instructions for causing the processor to perform the methods described herein. The communications module 60 communicates at least with the cloud computing software platform 10 and with the virtual machine launch entity and boot unit 22. The cloud computation resource pool 20 also includes computation resources, for example for executing virtual machines in accordance with requests originating from tenants.

Figure 5:
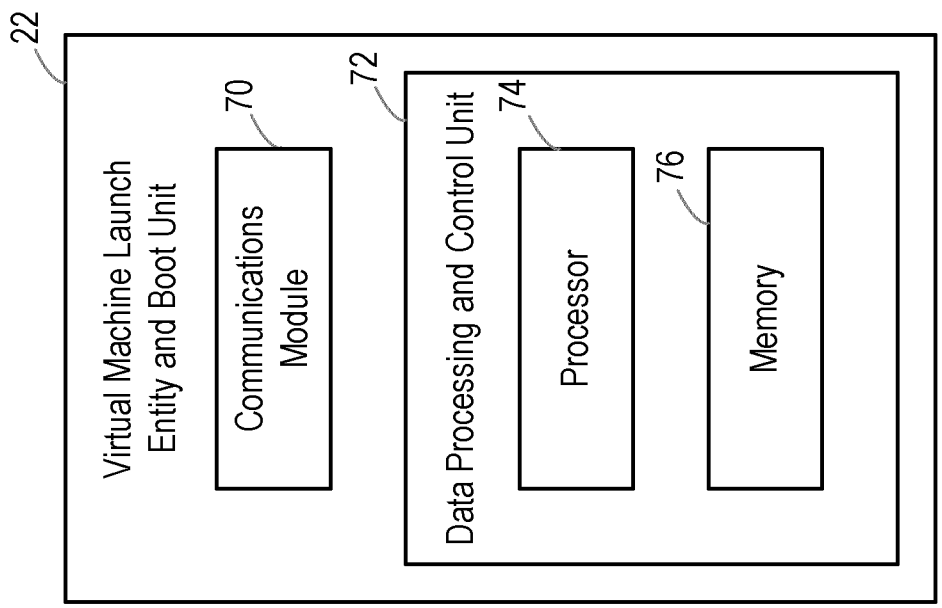
FIG. 5 illustrates a virtual machine launch entity and boot unit in the cloud computing system of FIG. 1.

FIG. 5 shows the form of the virtual machine launch entity and boot unit 22 in the cloud computing system of FIG. 1.

The virtual machine launch entity and boot unit 22 includes a communications module 70 and a data processing and control unit 72. The data processing and control unit 72 includes a processor 74 and a memory 76. The processor 74 performs data processing and logical operations, and the memory 76 stores working data and program instructions for causing the processor to perform the methods described herein. The communications module 70 communicates at least with the computation resource pool 20 and the verification entity 24.

FIG. 1 and FIG. 5 show the virtual machine launch entity and boot unit 22 as a single entity. However, it should be noted that the virtual machine launch entity and the boot unit may instead be provided as separate entities.

Figure 6A:
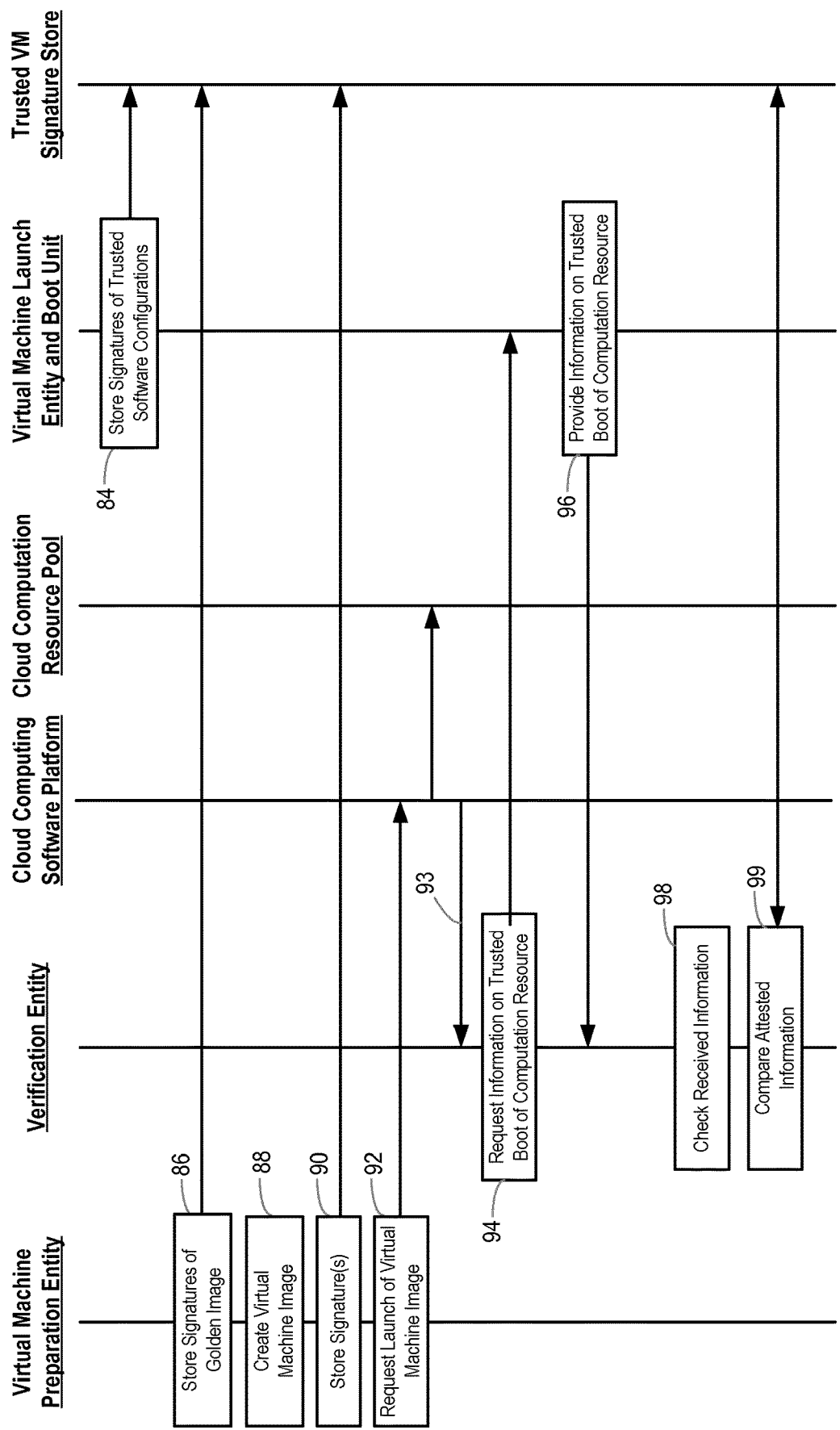
FIG. 6, made up of FIG. 6(a) and FIG. 6(b), illustrates a method of launching a virtual machine image with attestable integrity.
Figure 6B:
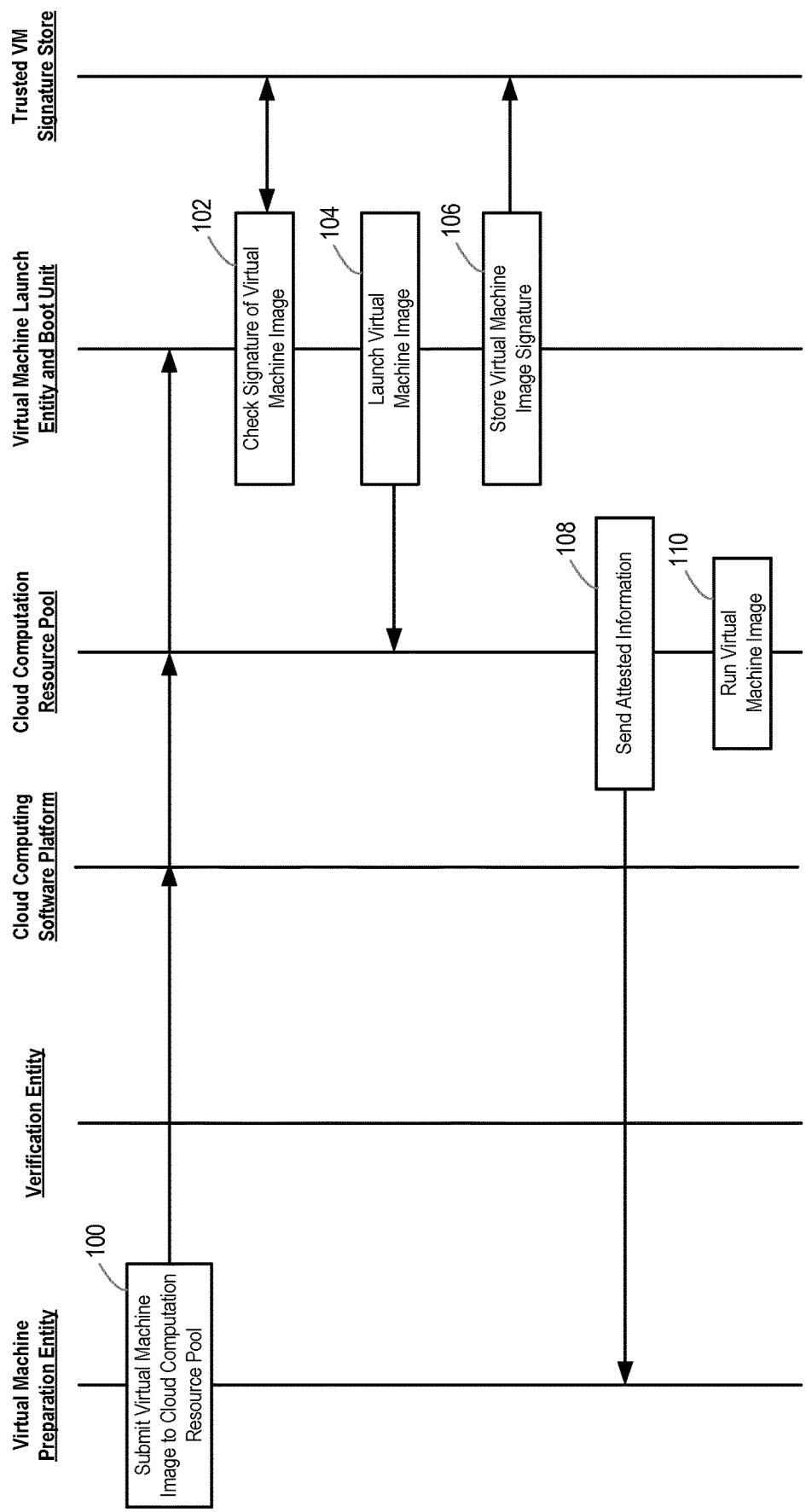

FIG. 6 is a flow chart, illustrating a method in accordance with one embodiment.

As described in more detail below, embodiments of the invention use a Keyless Signature Infrastructure (KSI), for example as described in "Keyless Signatures' Infrastructure: How to Build Global Distributed Hash-Trees", Ahto Buldas, Andres Kroonmaa and Risto Laanoja, for providing data integrity, time stamping and signer identification services. KSI is a hash-tree (Merkle-tree) based data protection technology, which utilizes data hashes and hash trees for generating signature tokens for the data to be integrity protected.

The Keyless Signature Infrastructure can be extended to facilitate digital signature with a non-repudiation property through the use of one-time secret keys as described in "Efficient Quantum-Immune Keyless Signatures with Identity", Ahto Buldas, Risto Laanoja and Ahto Truu. The use of Quantum-Immune Keyless Signatures with Identity (QSI) builds one-time key generators for each entity that must be identified. Also other schemes that provide secret keys can be combined with KSI to achieve digital signatures with a non-repudiation property. However, the references to KSI and QSI are provided only as an example of quantum-immune schemes to achieve integrity protection and signatures with non-repudiation respectively.

Entities, that is clients or applications, such as the virtual machine preparation entity 30 and the virtual machine launch entity and boot unit 22 in FIG. 1, that want to use KSI need to be adapted for that purpose. Towards this end, the KSI adapted clients (KSI applications) integrate the KSI Software Development Kit (Application Programming Interface), providing the required interfaces towards the KSI service. Data signing requests are sent from a client via the KSI SDK, which also provides data validation logic and the needed verification interface towards the KSI network. The KSI application is responsible for combining the data and the KSI signature, and storing the KSI signature.

Thus, as shown in FIG. 1, the KSI Software Development Kit is embedded in at least the virtual machine launch entity and boot unit 22, the verification entity 24, and the virtual machine preparation entity 30.

In modern computer systems, security is enhanced by introducing a trusted boot process, for example using a Unified Extensible Firmware Interface (UEFI) boot or tboot solution. It is generally assumed here that the trusted boot is a measured boot, meaning that the software components (and possibly configuration data) that are loaded in the boot process are verified (measured) on integrity and that the results of the verifications is securely (integrity protected) stored for later use/reference.

It is assumed when starting the process of FIG. 6 that at least some of the computation resources in the computation resource pool 20 have been booted, and that the boot process has been securely logged and protected using KSI or preferably QSI so the compute resource can be identified. The signatures of trusted pool software configurations are stored in the trusted VM signature store entity, as shown in step 84 of FIG. 6.

A Golden Image is established, that is a trusted virtual machine or virtual machine image, upon which further virtual machines or virtual machine images can be built. The term "trusted" means that the virtual machine is relied upon to a certain extent. A KSI signature is created when the Golden Image is established, along with a static state secret that both ensures the integrity of the Golden Image and identifies its origin. The KSI signature is stored in the storage unit 32 shown in FIG. 1, as shown in step 86 of FIG. 6.

As described in more detail below, the use of KSI-based integrity attestation makes it possible to verify dynamic state integrity of the virtual machine, without the use of keys or certificates. The integrity of any images created based on the Golden Image can then be attested over their entire lifecycle. This also makes it possible to migrate virtual machines in a cloud deployment without a need for key and certificate management.

In order to create a virtual machine image, an asymmetric key pair is created in the virtual machine preparation entity 30 (for example using the Barbican security API in the case where the OpenStack cloud computing software platform is used), so that it can be used to provide an attribution of origin to a KSI data signature used for the static clean state attestable integrity. An attribution of origin can be achieved using a QSI "public key certificate" and one-time password. The QSI "public key certificate" can be stored in the storage unit 32, acting as a trusted virtual machine signature store.

Thus, in step 88 of the process shown in FIG. 6, the virtual machine preparation entity 30 is used to create a virtual machine image based on a trusted virtual machine, for example the Golden Image mentioned above. The creation of the virtual machine image involves the creation of a KSI data signature to provide a time of signing and integrity of the static virtual machine image. It may also involve creating QSI data to provide proof of the identity of the signing entity. The signature or signatures are stored into the storage unit 32, or trusted virtual machine signature store, as shown in step 90 of FIG. 6.

At the time of creation of the virtual machine image in step 88, the user creating the image is authenticated, for example by means of the identity service component 16 of the cloud computing software platform 10.

The virtual machine image is then stored as a Binary Large Object (BLOB) in the image service component 14 of the cloud computing software platform 10.

In step 92, the user indicates that the virtual machine image is to be launched, by sending a command to the dashboard 18 of the cloud computing software platform 10, which in turn sends a launch instruction to the controller 19 of the cloud computing software platform 10.

The controller 19 of the cloud computing software platform 10 contacts the verification entity 24 to obtain information as to whether a computation resource can be trusted, as shown at 93 in FIG. 6.

Thus, in step 94, the verification entity 24 contacts the boot unit of the virtual machine launch entity and boot unit 22, to obtain attested information on the trusted boot of the relevant computation resource.

In step 96 the virtual machine launch entity and boot unit 22 provides to the verification entity 24 the requested attested information on the trusted boot of the relevant computation resource, for example a QSI signed value of the boot log.

In step 98, the verification entity 24 logs its actions and checks the received information using KSI and/or QSI, as appropriate.

In step 99, the trusted resource pool verification entity then compares attested information on the trusted boot received in step 94 of the relevant computation resource with an attested list of trusted computing pool software configurations stored in the trusted VM signature store. Towards this end the boot unit has recorded information in a protected area regarding what has been booted. Integrity protection can here be provided through hardware, for example a Trusted Platform Module (TPM) or by using KSI. In addition the boot unit has a means to sign and provide the recorded data upon request. The recording could be log files or registers in hardware, e.g. PCR registers in a TPM. The attested information is integrity protected, for example using KSI signature including identity proof by QSI.

When it is determined that the computation resource is trusted, the process passes to step 100. Based on the request made by the virtual machine preparation entity 30 in step 92, the controller 19 of the cloud computing software platform 10 carries out the submission to the computation resource pool 20.

In step 102, the virtual machine launch entity and boot unit 22 retrieves the KSI signature and identity proof of the image from the trusted VM signature store and verifies the signature by using the KSI SDK communicating with KSI verification service in order to verify the integrity, the authenticity and proof of origin of the VM image.

Thus, the virtual machine launch entity and boot unit 22 provides information in step 96 regarding the software that has been booted on the computation resource and receives information on the protection value and log data of the virtual machine image, to facilitate the decision as to whether the virtual machine launch should be initiated.

In step 104, assuming that the check in step 102 is successful, the virtual machine launch entity and boot unit 22 launches the image on the trusted computation resource. The launch process also includes creating KSI data signature to provide information about the time of signing and the integrity of the dynamic virtual machine image for the rest of the lifecycle of the virtual machine. The advantage as compared with other existing methods is the scalability and ease of management when using KSI, due to not requiring e.g. certificate lifecycle management.

At the moment when the virtual machine image is launched, it changes its state, e.g. clock, data related to its perception of the state of the (simulated) hardware, etc. Hence the virtual machine and its KSI signature can be updated to reflect this, to provide the dynamic integrity protection. As an alternative, it is possible to log and integrity protect via KSI what is affecting the state of the virtual machine. Then the collection of corresponding log records gives the dynamic protection.

In step 106, the virtual machine launch entity and boot unit 22 stores this image signature in KSI, using the KSI service in the trusted virtual machine signature store application, for example in the partition that is specific to the tenant.

In step 108, the cloud computation resource pool sends a message containing the attested information about the launch taking place as requested in a trusted computing pool to the tenant, for example to the virtual machine preparation entity 30, to provide assurance to the tenant that the virtual machine has been started in the desired manner.

In step 110, the cloud computation resource pool starts to run the virtual machine image on the trusted computation resource.

The methods described herein can also be used to provide attestable integrity in the event of migration or cloning of a virtual machine.

In the case of these events, a process similar to that shown in FIG. 6 takes place, except that the steps of creating the virtual machine image, and requesting the launch of the virtual machine image take place when the existing trusted virtual machine image is migrated or cloned. In that case, the existing trusted virtual machine image may itself have been created and launched by a process as shown in FIG. 6, and has a Keyless Signature Infrastructure signature stored in a signature store.

Then during the running of the existing trusted virtual machine image, an administrator command or an automated process may initiate the creation of a new virtual machine image, either by migration or cloning. In such situations, the new virtual machine image is given a new ID, but preserves aspects of the configuration of the existing trusted virtual machine image, including its name, any metadata, IP address, the existing KSI signature and other properties.

The migration or cloning instruction is sent to the cloud computing software platform 10, and a process as described from steps 94 onwards in FIG. 6 can take place to ensure that the new virtual machine image is launched on trusted computation resources.

Thus, in the methods described herein, KSI based integrity attestation is used, making it possible to verify dynamic state integrity of the virtual machine image without the use of keys or certificates after the initial clean state establishment.

This also makes it possible to migrate virtual machines in a cloud deployment, again without a need for key and certificate management.

Whenever proof of trust of the VM images is required, for example in a forensic investigation, or if the tenant is running a service that has to demonstrate compliance with legal frameworks (e.g. for health care IT services, or business standards), the trustworthy attestation can be audited by external parties where attestation records are time-stamped and integrity protected.

There is thus described a method and a system for ensuring integrity of a virtual machine image.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method of verifying the integrity of a virtual machine in a cloud computing deployment, the method comprising:
creating a virtual machine image derived from a trusted virtual machine, wherein the trusted virtual machine has a first Keyless Signature Infrastructure (KSI) signature stored in a signature store;
determining whether a computation resource can be trusted, wherein determining whether the computation resource can be trusted comprises:
receiving attested information regarding software that has been booted on the computation resource, wherein the attested information comprises a Quantum-Immune Keyless Signatures with Identity (QSI) signed value of a boot log; and
confirming whether the computation resource can be trusted based on comparing the attested information with an attested list of trusted computing pool software configurations;
as a result of determining that the computation resource can be trusted:
submitting the virtual machine image to a computation resource pool of the trusted computation resource;

verifying the virtual machine image, wherein the verifying comprises checking a signature of the virtual machine image against the first KSI signature of the trusted virtual machine;

as a result of verifying the virtual machine image, launching the virtual machine image on the trusted computation resource;

creating a second KSI signature of the virtual machine image, wherein the second KSI is based on the launch of the virtual machine image; and storing the second KSI signature of the virtual machine image in a signature store.

2. The method of claim 1, wherein the virtual machine image comprises one of: a migration of the trusted virtual machine and a clone of the trusted virtual machine.

3. The method of claim 1, wherein the trusted virtual machine is a virtual machine golden image.

4. A system, comprising:
processing circuitry comprising at least one processor; and
a memory, the memory containing instructions executable by the processing circuitry, wherein the system is operable to carry out the method of claim 1.

5. A method for use in a virtual machine preparation entity, comprising:
receiving a request for creation of a virtual machine image derived from a trusted virtual machine,
creating the virtual machine image, wherein creating the virtual machine image comprises creating an asymmetric key pair comprising a public key certificate and a one-time password for the virtual machine image;
using the public key certificate and the one-time password to provide an attribution of origin to a Keyless Signature Infrastructure (KSI) data signature used for a static clean state attestable integrity;
creating a signature of the virtual machine image; and
storing the KSI signature of the virtual machine image and the public key certificate in a signature store.

6. The method of claim 5, wherein the virtual machine image comprises a migration or a clone of the trusted virtual machine.

7. The method of claim 5, wherein the trusted virtual machine is a virtual machine golden image.

8. A virtual machine preparation entity, comprising:
processing circuitry comprising a processor; and
a memory, the memory containing instructions executable by the processing circuitry, wherein the virtual machine preparation entity is operable to carry out the method of claim 5.

9. A method for use in a virtual machine image launch entity, comprising:
receiving a request to launch a virtual machine image on a computation resource of a computation resource pool;
determining if the computation resource can be trusted, wherein determining whether the computation resource can be trusted comprises:
receiving attested information regarding software that has been booted on the computation resource, wherein the attested information comprises a Quantum-Immune Keyless Signatures with Identity (QSI) signed value of a boot log; and
confirming whether the computation resource can be trusted based on comparing the attested information with an attested list of trusted computing pool software configurations; and
as a result of determining that the computation resource can be trusted, launching the virtual machine image on the computation resource;
creating a Keyless Signature Infrastructure (KSI) signature of the virtual machine image, wherein the KSI is based on the launch of the virtual machine image; and
storing the KSI signature of the virtual machine image in the signature store.

10. The method of claim 9, wherein determining whether the computation resource can be trusted comprises receiving a notification from a verification entity.

11. A virtual machine image launch entity, comprising:
processing circuitry comprising a processor; and
a memory, the memory containing instructions executable by the processing circuitry, wherein the virtual machine entity is operable to carry out the method of claim 9.

* * * * *